United States Patent Office 3,105,052
Patented Sept. 24, 1963

3,105,052
PREPARATION OF REFRACTORY OXIDE
MICROSPHERES
Claude C. Haws, Jr., Knoxville, Tenn., assignor to the United States of America as represented by the United States Atomic Energy Commission
No Drawing. Filed Mar. 1, 1960, Ser. No. 12,239
9 Claims. (Cl. 252—301.1)

My invention relates to refractory oxide particles or more particularly to a method of preparing spherical thorium oxide particles.

Refractory oxides in the form of spherical particles offer advantages over irregularly shaped particles. Spherical particles are particularly suitable in applications depending upon surface effects. Particles of this shape offer the theoretical minimum surface area, better wetting characteristics and higher density upon compaction for ceramic uses. Aqueous slurries of spherical particles offer less resistance to pumping; consequently, these particles may be handled more readily in fabrication procedures utilizing slurries such as slip casting methods of preparing refractory bodies such as crucibles.

An important application of spherical refractory oxide particles is in the use of thorium oxide slurries in nuclear reactors. Thorium is useful as a source of fissionable material, the fissionable uranium 233 isotope being produced by thermal neutron irradiation of thorium 232. This property of thorium is utilized in thermal breeder nuclear reactors in which more fissionable uranium is produced from thorium than is consumed as fuel. In one type of thermal breeder reactor an aqueous solution of uranyl sulfate enriched in fissionable uranium 235 is circulated through a central core and an aqueous slurry of thorium oxide is circulated through a blanket surrounding the core. For further information regarding the use of thorium oxide slurries in this type reactor, reference may be made to pages 128–190 of "Fluid Fuel Reactors," by J. A. Lane, H. G. McPherson and Frank Maslan, Addison-Wesley Publishing Co. (1958), this book having been presented at the Second International Conference on the Peaceful Uses of Atomic Energy held at Geneva, Switzerland.

In order to be employed in this type reactor the thorium oxide must be in a physical form suitable to remain in suspension at high concentrations, e.g., 500 to 1500 grams thorium per liter, and for extended periods of continuous circulation during reactor operation. To avoid damage to the reactor system the oxide particles must also be relatively non-erosive. It may be readily seen that the physical properties of the thorium oxide particles are of prime importance in meeting these requirements.

Two of the most important factors with respect to the thorium oxide physical properties are the mechanical stability of the particles and the yield stress value. Particles prepared by certain previously used methods such as low temperature calcination of thorium oxalate tend to degrade upon being pumped extensively as a slurry, and the resulting fine particles cause difficulties by flocculating and caking on the surface of the system. The use of higher calcination temperatures, e.g., 1600° C., has resulted in more stable particles which are not susceptible to caking. These high-temperature calcined particles, however, still exhibit a high yield stress value. The particle yield stress, that is, the sheer stress required before an appreciable deformation rate is obtained, strongly influences the slurry velocity required for the onset of turbulence, with turbulent flow being required in the reactor to maintain the particles in suspension and to obtain good heat-transfer. High yield stress results in an increase in the required velocity and an increase in the power input to pumps, thus seriously limiting the design of the reactor system. A yield stress less than 0.1 lb./sq. ft. is desired in order to produce turbulent flow without unduly restricting reactor design. Thorium oxide prepared by the oxalate calcination methods mentioned above is unsuitable in this regard, since the yield stress obtained in these methods is generally over 0.1 lb./sq. ft.

Other physical properties of importance in thorium oxide slurries are oxide surface area and particle size. Uniform particles averaging above one micron in diameter are desired because of the unfavorable colloidal properties exhibited by smaller particles. Minimum particle surface area is desired in order to keep occlusion of impurities by the particles to a minimum. Larger surface areas also tend to increase the particle yield stress.

Some improvement with respect to these properties has previously been obtained by preparing spherical thorium oxide particles, which exhibit this low yield stress and less abrasiveness. Spherical particles have been prepared by various methods such as spraying a thoria sol into a dispersing medium and calcining the resulting particles. Particles prepared by this method, however, are fragile and tend to degrade upon being pumped. Spherical particles have also been made by burning an alcohol-acetone solution of thorium nitrate in an air-fed burner and collecting the oxide particles. The temperatures reached in this method, however, are well below the oxide melting point so that the particles are not fused into solid mechanically strong spheres. In addition, the particles produced by this method exhibit undesirably large surface area and small particle size.

Uranium oxide slurries may also be employed in homogeneous nuclear reactors, with the uranium oxide being employed as fuel in the reactor core. In general, the same problems discussed above for thorium oxide likewise apply to the use of uranium oxide in slurries. Combinations of thorium and uranium oxides may also be employed in one-region or two-region thermal breeder reactors.

It is, therefore, an object of my invention to provide improved spherical refractory oxide particles comprising primarily thorium oxide, uranium oxide or a combination of these oxides.

Another object is to provide a method of preparing solid refractory oxide particles.

Another object is to provide a method of preparing spherical thorium oxide particles which exhibit a low yield stress value.

Another object is to provide spherical particles showing low erosive corrosion rates in a system through which they are pumped as a slurry.

Another object is to provide a method of preparing uniform, spherical thorium oxide particles averaging above one micron in diameter.

Another object is to provide a method of preparing solid, homogeneous spherical thorium oxide particles which are stable under the chemical and mechanical conditions encountered in a nuclear reactor.

Other objects and advantages of my invention will be apparent from the following detailed description and claims appended hereto.

In accordance with my invention I provide spherical, fused refractory oxide particles comprising a major proportion of at least one oxide selected from the group of thorium oxide and uranium oxide and a minor proportion of at least one oxide selected from the group of aluminum oxide, beryllium oxide and silicon dioxide. Particles of this composition are prepared by burning a finely divided stream of a combustible organic solution of the metal nitrates at a temperature at least as high as the melting point of the resulting particles. I have found that the incorporation of one to ten weight percent aluminum oxide or silicon dioxide lowers the melting point of thorium oxide or thorium-uranium oxides to such an extent that the resulting particles may be fused to form spheres in a commonly available flame apparatus such as a reflected oxy-acetylene burner. The same effect may be obtained by incorporating a minimum of 12 weight percent beryllium oxide. The particles produced by this method exhibit good chemical and mechanical stability and yield stress values substantially lower than obtained by previously used methods. The particles are relatively uniform in size, averaging 1 to 2 microns in diameter, and the particle surface area is suitably low for slurry use. In addition, low erosive corrosion rates are obtained upon pumping these particles as a slurry.

The improved spherical particles are obtained by fusion of the oxide particles formed when the dispersed solution is burned at an elevated temperature in the flame. The high melting point of thorium oxide (approximately 3220° C.) is lowered by means of the additive oxide to a temperature attainable with conventional oxygen-fed burners. The melting point is lowered to a temperature within the range of approximately 1800° C. to 2400° C. for the oxide combinations within the scope of my invention, with the exact temperature depending on the particular oxide combination. Determination of the exact temperature in the flame is not practical; accordingly, the above temperatures are taken as approximations based on available ceramic information and upon measured reflector temperatures.

Although my invention will be illustrated primarily with reference to the addition of aluminum oxide to thorium oxide, it is to be understood that the same principles and procedures also apply to the other oxide combinations. Uranium oxide, particularly at the concentrations of primary interest in thorium oxide blanket slurries, i.e., at a uranium-to-thorium ratio of 0.03 to 0.08, does not lower the melting point of thorium oxide sufficiently to allow the formation of spheres. Combinations of uranium oxide with thorium oxide may thus be considered as equivalent to thorium oxide alone in the preparation of spherical particles. Uranium oxide alone also behaves in a manner similar to thorium oxide in this process.

An additive oxide content within the range of 1 to 10 weight percent in the product mixed oxide may be employed for aluminum oxide and silicon dioxide or for combinations of these additives, and an additive content within the range of 2 to 3 percent is preferred. Even less than one percent, e.g., as low as one-half percent, may be employed where special high-temperature equipment is employed. At least one percent is required, however, for a conventional reflected flame burner. In the case of beryllium oxide an additive content of at least 12 weight percent is required, and a content within the range of 12 to 25 percent is preferred. The composition of the product oxide may be readily controlled by adjusting the relative concentrations of the metal cation constituents in the starting nitrate solution.

The starting feed solution is prepared by dissolving the desired constituents in a combustible organic nitrate solution, preferably by adding the nitrate compounds such as thorium nitrate, uranyl nitrate, beryllium nitrate and aluminum nitrate to the solvent. Silicon may be conveniently added as the soluble compound tetraethylorthosilicate. The total equivalent concentration of the cation constituents in the solvent is not critical, and any convenient concentration such as 100 grams per liter may be used. The solvent to be employed in the nitrate feed solution is not critical, and any combustible organic solvent in which the mixed oxide constituents dissolve may be employed. Examples of suitable solvents are alcohols, ethers, benzene and acetone. Because of their low cost and ease of handling methanol and isopropanol are preferred.

The combustible feed solution is continuously introduced into a conventional oxygen-fed burner by providing an orifice in the burner and spraying the solution through the orifice. In order to obtain the required high temperatures undiluted oxygen must be supplied to the flame. Commercially available oxygen is suitable for this purpose. The fuel for the flame may be provided by merely burning the combustible solvent, but an excessive amount of solvent would be required to maintain the desired temperature in this manner. It is accordingly preferred to employ a separate gaseous fuel as the primary source of heat. Although the gaseous fuel is not critical, conventional gases such as butane, natural gas, and propane are preferred because of their low cost and capacity to produce high temperatures. Acetylene gas may also be employed.

In order to obtain fused spherical particles, the burner must be provided with a suitable reflector. In the absence of a reflector the oxide particles are rapidly cooled upon formation as a result of heat loss by radiation. The rapid loss of heat thus incurred prevents the particle temperature from reaching a level equal to, or greater than, its melting point and from maintaining this temperature for a sufficient time to allow fusion and sphere formation. The reflector may comprise any heat-reflecting refractory material capable of withstanding temperatures over 2000° C., this temperature being reached at the periphery of the flame. Examples of suitable reflector materials are stabilized zirconia, magnesia and high-purity alumina, with stabilized zirconia being preferred. Although the arrangement of the flame apparatus is not critical, it is preferred to dispose the burner downwardly through an elongated, cylindrical-shaped reflector. Suitable dimensions for the reflector are 3 inches inside diameter, 24 inches long and 1 inch thick.

The spherical particles may be recovered by providing a trap below the reflector to separate most of the particles from the exit gas stream. The gas stream may then be filtered to recover any remaining particles.

My invention is further illustrated by the following specific examples:

EXAMPLE I

Oxide particles were prepared by flame calcination in each of a series of runs. The apparatus employed in these runs comprised an oxy-propane burner disposed downwardly at the top of a cylindrical stabilized zirconia reflector 24 inches long, 3 inches inside diameter and 1 inch thick. The burner was provided with an orifice through which the feed solution was sprayed into the flame zone. The bottom of the reflector was connected to a vertical exit pipe provided with external cooling coils and a container at the lower end of the pipe for collecting the particles. Above the container a junction of the exit pipe extended upward diagonally for removal of the exit gases, a spray cooler being provided at the upper extremity for removal of any remaining particles. Thermocouples were placed at the outside of the reflector and connected to temperature recorders. In each run the feed solution was prepared by dissolving thorium nitrate in methanol at a concentration of 160 grams per liter. Aluminum nitrate at varying concentrations was added for each run except the first. Uranyl nitrate at varying concentrations was added for each run except the fourth. The feed solution was continuously introduced into the flame in each run and at least 100 grams of oxide particles were collected. The outside reflector temperature, which was estimated to be approximately 1000° C. less than the flame temperature and 500 to 600° C. less than the particle temperature, was continuously recorded. The surface area, particle size and yield stress were determined for the particles collected in each run. Surface area was measured by means of a conventional nitrogen absorption method. Particle size was calculated from observed settling rates in an aqueous system. Yield stress was determined by means of a capillary viscometry test conducted in accordance with the principles disclosed in "Industrial Application of Colloidal and Amorphous Materials," by W. K. Lewis, Lombard Squires and Geoffrey Broughton, at page 138. Further details and results obtained in these runs may be seen by reference to the following table.

*Table I*
FLAME CALCINATION OF THORIUM OXIDE—ALUMINUM OXIDE

| Run No. | Average Reflector Temp. (° C.) | $Al_2O_3$ Concentration (Wt. percent) | $U_3O_8$ Concentration (Wt. percent) | Feed Rate (Milliliters per min.) | Average Particle Size (Microns) | Surface Area (Sq. Meters per Gram) | Yield Stress (Lbs. per sq. ft.) |
|---|---|---|---|---|---|---|---|
| 1 | 1,475 | 0 | 12 | 20 | 2.4 | 6.2 | 0.8 |
| 2 | 1,520 | 1 | 5.4 | 22 | 2.0 | 2.6 | 0.026 |
| 3 | 1,530 | 2.5 | 7.6 | 28 | 1.7 | 2.4 | 0.05 |
| 4 | 1,450 | 5 | 0 | 20 | 1.0 | 1.3 | 0.026 |
| 5 | 1,425 | 5 | 5.7 | 25 | 1.7 | 1.8 | 0.02 |
| 6 | 1,400 | 10 | 7.5 | 23 | 1.8 | 5.7 | 0.2 |

The decreased yield stress obtained by the addition of aluminum oxide is readily apparent from the above table. Without aluminum oxide the yield stress is high (0.8 lb./sq. ft.); with ten percent 0.2 lb./sq. ft. is obtained; and at 1 to 5 percent a desirable value of 0.02 to 0.05 lb./sq. ft. is obtained.

By means of electron micrographic examination the particles containing aluminum oxide were revealed to be spherical in shape and relatively uniform. The particles prepared in run 1 without aluminum oxide were of highly irregular shapes and non-uniform particle size.

EXAMPLE II

The erosiveness and mechanical stability of flame-calcined particles were determined by means of a slurry circulation test. Spherical oxide particles comprising thorium oxide and uranium oxide at a uranium-to-thorium ratio of 0.08 and 5 weight percent aluminum oxide were prepared in accordance with the procedure of Example I. A heavy water slurry was prepared by adding the particles to heavy water to produce a concentration of 446 grams of the mixed oxide per kilogram of heavy water. The slurry was circulated in a rotating toroid under an oxygen atmosphere at a velocity of 26 feet per second for 291 hours at a temperature of 285° C. The erosive corrosion rate was determined from the weight loss of a 347 stainless steel pin in the toroid. The oxide particle size was determined before and after circulation in the slurry by means of a sedimentation test. The erosive corrosion rate obtained in this test was 2.4 mils per year. Particle size was 1.1 microns before the test and 1.4 microns after circulation in the toroid.

The low erosiveness of the oxide particles prepared by the method of my invention is clearly shown by the 2.4 mils per year rate, which would allow circulation in a nuclear reactor for extended periods of operation. Mechanical stability of the particles is evidenced by the relatively small change in particle size. Under these conditions the loss of uranium to the solution is only approximately 5 parts per million; thus, the particles also show a high degree of chemical stability.

The above examples are merely illustrative and are not to be construed as limiting the scope of my invention, which is limited only as indicated in the appended claims. It is also to be understood that variations in apparatus and procedure may be employed without departing from the scope of the invention.

Having thus described my invention, I claim:

1. The method of preparing fused spherical oxide particles which comprises introducing a dispersed stream of a combustible organic solution containing dissolved therein thorium nitrate and aluminum nitrate into a reflected, oxygen-fed flame at a temperature above the melting point of the resulting particles and recovering said particles, the ratio of said thorium nitrate to said aluminum nitrate being adjusted to provide a thorium oxide content of 90 to 99 weight percent in said particles.

2. The method of claim 1 wherein the ratio of said thorium nitrate to said aluminum nitrate is adjusted to provide a thorium oxide content of 97 to 98 weight percent in said particles.

3. The method of claim 1 wherein uranium values are provided in said solution at a uranium-to-thorium weight ratio of 0.03 to 0.08.

4. The method of claim 1 wherein said temperature is within the range of approximately 1800° C. to 2400° C.

5. The method of preparing fused spherical oxide particles which comprises introducing a dispersed stream of a combustible organic solution containing dissolved therein thorium nitrate and beryllium nitrate into a reflected, oxygen-fed flame at a temperature above the melting point of the resulting particles, the ratio of said thorium nitrate to said beryllium nitrate being adjusted to provide a thorium oxide content of 75 to 88 weight percent in said particles.

6. The method of claim 5 wherein uranium values are provided in said solution at a uranium-to-thorium weight ratio of 0.03 to 0.08.

7. The method of preparing fused spherical oxide particles which comprises introducing a dispersed stream of a combustible organic solution containing dissolved therein thorium nitrate and silicon values into a reflected, oxygen-fed flame at a temperature above the melting point of the resulting particles and recovering said particles, the ratio of said thorium nitrate to said silicon values being adjusted to provide a thorium oxide content of 90 to 99 weight percent in said particles.

8. The method of claim 7 wherein uranium values are provided in said solution at a uranium-to-thorium weight ratio of 0.03 to 0.08.

9. The method of preparing fused spherical oxide particles having a diameter within the range of 1 to 2 microns which comprises introducing a dispersed stream of a combustible organic solution containing dissolved therein a major proportion of thorium nitrate and a minor proportion of refractory-oxide-forming values into a reflected oxygen-fed flame at a temperature above the melting point of the resulting particles and recovering said particles, said refractory-oxide-forming values being selected from the group consisting of silicon at a proportion sufficient to provide 1 to 10 weight percent silicon dioxide in said particles, aluminum at a proportion sufficient to provide 1 to 10 weight percent aluminum oxide in said particles and beryllium at a proportion sufficient to provide 12 to 25 weight percent beryllium oxide in said particles.

References Cited in the file of this patent

UNITED STATES PATENTS

| | | |
|---|---|---|
| 2,218,381 | Gooskens | Oct. 15, 1940 |
| 2,690,376 | Hoffman | Sept. 28, 1954 |
| 2,838,452 | West | June 10, 1958 |
| 2,900,244 | Bradstreet | Aug. 18, 1959 |

FOREIGN PATENTS

| | | |
|---|---|---|
| 4,461 | Great Britain | 1908 |
| 792,590 | France | Oct. 21, 1935 |

OTHER REFERENCES

NSA 12: 17332, Nuclear Science Abstracts, vol. 12, No. 23, Dec. 15, 1958.

Lane et al.: Fluid Fuel Reactors, Addison-Wesley Publishing Co. (1958), pp. 129–132.

BMI-1117, "Effects of Ceramic or Metal Additions in High–$UO_2$ Bodies, available from U.S. Atomic Energy Commission, Technical Information Extension, P.O. Box 1001, Oak Ridge, Tenn., pp. 5, 9, 13, 17.

Reactor Core Materials, Technical Progress Review, prepared by Battelle Memorial Institute for the USAEC, volume 1, No. 1, p. 13 March 1958; volume 1, No. 2, p. 14, May 1958; volume 2, No. 4, p. 9, November 1959.

Harrington, et al.: Chem. Eng. Progress, volume 54, No. 3 March 1958.

Nuclear Science Abstracts (N.S.A.), volume 12, No. 23, 17, 322, December 15, 1958.